(12) United States Patent
Isoi (10) Patent No.: US 10,282,290 B2
(45) Date of Patent: May 7, 2019

(54) ANALYZING DEVICE MANAGEMENT SYSTEM

(71) Applicant: Shimadzu Corporation, Kyoto (JP)

(72) Inventor: Takuya Isoi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 15/320,991

(22) PCT Filed: Jun. 24, 2014

(86) PCT No.: PCT/JP2014/066669
§ 371 (c)(1),
(2) Date: Dec. 21, 2016

(87) PCT Pub. No.: WO2015/198392
PCT Pub. Date: Dec. 30, 2015

(65) Prior Publication Data
US 2017/0161188 A1    Jun. 8, 2017

(51) Int. Cl.
*G06F 12/08* (2016.01)
*G06F 12/0802* (2016.01)
*G06F 9/46* (2006.01)
*G06F 17/30* (2006.01)
*G06F 12/02* (2006.01)

(52) U.S. Cl.
CPC .......... *G06F 12/0802* (2013.01); *G06F 9/463* (2013.01); *G06F 9/465* (2013.01); *G06F 17/30002* (2013.01); *G06F 17/30144* (2013.01); *G06F 12/02* (2013.01); *G06F 2212/62* (2013.01)

(58) Field of Classification Search
CPC ......... G06F 17/30002; G06F 17/30144; G06F 9/463; G06F 9/465
See application file for complete search history.

(56) References Cited

U.S. PATENT DOCUMENTS 6,687,716 B1 * 2/2004 Bradley ............ G06F 17/30168
707/822
7,546,319 B1 * 6/2009 Srinivasan ........ G06F 17/30094
(Continued)

FOREIGN PATENT DOCUMENTS

JP    H07-141245 A    6/1995
JP    2000-155731 A    6/2000
(Continued)

OTHER PUBLICATIONS

International Search Report dated Sep. 30, 2014 from corresponding International Application No. PCT/JP2014/066669; 5 pgs.
(Continued)

*Primary Examiner* — Ryan Bertram
(74) *Attorney, Agent, or Firm* — Maier & Maier, PLLC (57) ABSTRACT

An information management system for detecting not only a set of management target data which has been changed but also another set of management target data which is affected by that change among a plurality of sets of management target data. The present system includes a dependency manager for managing the association of one set of management target data with another set of management target data which depends on the former set of management target data; and an inspector for detecting a set of management target data which is affected by a change in another set of management target data.

10 Claims, 11 Drawing Sheets

(56) References Cited

U.S. PATENT DOCUMENTS

| | | | |
|---|---|---|---|
| 8,504,597 B2* | 8/2013 | Pitts | G06F 17/30144 707/827 |
| 2010/0333094 A1* | 12/2010 | Restall | G06F 9/5027 718/102 |
| 2011/0022813 A1* | 1/2011 | Yatsuki | G06F 11/1435 711/165 |
| 2013/0191439 A1* | 7/2013 | Kern | G06F 9/52 709/203 |
| 2014/0006360 A1* | 1/2014 | Iriyama | G06F 17/30371 707/690 |
| 2014/0297594 A1* | 10/2014 | Chtrasberg | G06F 17/30289 707/643 |

FOREIGN PATENT DOCUMENTS

| | | |
|---|---|---|
| JP | 2004-028864 A | 1/2004 |
| JP | 2013-174500 A | 9/2013 |
| JP | 2014-10782 A | 1/2014 |

OTHER PUBLICATIONS

Written Opinion by ISA dated Sep. 30, 2014, in connection with corresponding Application No. PCT/JP2014/066669 (10 pgs., including English translation).

Japanese Office Action dated May 9, 2017, in connection with corresponding JP Application No. 2016-528784 (7 pgs., including English translation).

* cited by examiner

2014/03/01 16:28:35
Analysis execution file A has been changed by XXX.
Mass-to-charge ratio has been changed from 600 to 650.
The reason for this change is because the mass spectrometer has been replaced with a newly purchased one.
Management target data affected by this change: batch file B, batch file C

Fig. 15B

2014/03/01 16:28:35
Analysis execution file A cannot be changed.
Batch file B which depends on analysis execution file A is protected from change.

Fig. 15C

2014/03/01 16:28:35
Analysis execution file A canot be changed.
Batch file B which depends on analysis execution file A is protected from change.
A copy of analysis execution file A has been saved as analysis execution file A1.
Modify analysis execution file A1.

Fig. 15D

2014/03/01 16:28:35
There is a difference between analysis execution file A1 and analysis execution file A2.
Mass-to-charge ratio is 600 and 650.
Management target data affected by this difference: batch file B1, batch file B2

ANALYZING DEVICE MANAGEMENT SYSTEM

TECHNICAL FIELD

The present invention relates to a data processing device, such as a data processing device for a sample analyzer, and particularly, to a system for managing a change in the data handled in such a data processing device (analyzing device management system).

BACKGROUND ART

In recent years, it has been required to comply with the standards (guidelines) on the process control and quality control prescribed in the GLP (Good Laboratory Practice) or GMP (Good Manufacturing Practice) or comply with the standards on electronic documents prescribed in 21 CFR PART 11 (U.S. regulations on electronic records and electronic signatures) when performing an analysis on a sample, particularly in research institutes which handle food, pharmaceuticals, medical tools or similar products. To comply with those standards, it is necessary to provide, in addition to the analyzing device control systems or analysis data processing systems, an information management system which checks, for example, that those system are appropriately administered, and that the control data, analysis data and other relevant data used in those systems are appropriately managed.

One of the targets managed by such an information management system is the control command data and control parameter data for controlling analyzing devices. For example, in an analysis performed on a sample using an analyzing device, the data which represent control commands and control parameters for operating the analyzing device are previously saved in the form of a file ("analysis execution file"). When the analysis is performed, the analysis operator specifies this analysis execution file to make the analyzing device perform the analysis under predetermined conditions with preset parameters. By using only an analysis execution file which has been duly created and checked as well as proved to be valid. (authenticated), the analysis is correctly carried out. The same applies to the analysis of the data obtained through a measurement (analysis data).

Therefore, when such an analysis execution file or other relevant data that have been duly authenticated are changed, it is necessary to correctly recognize and manage that change. Conventional information management systems are provided with the functions of monitoring such a change in the data.

CITATION LIST

Patent Literature

Patent Literature 1: JP 2013-174500 A

SUMMARY OF INVENTION

Technical Problem

In the case of continuously performing a plurality of analyses on a sample, it is common to create one continuous analysis execution file (batch file) for that continuous analysis and write the previously mentioned analysis execution files in the batch file, one file in each line, to conduct an automatic continuous analysis (batch processing).

Under such a situation, suppose that a portion of the control command data written in an analysis execution file has been rewritten. As noted earlier, the conventional information management system can recognize this change in the control command data in the analysis execution file concerned and notify a previously registered administrator of this fact. However, an analysis operator using a batch file in which the analysis execution file concerned is written in one line may possibly carry out the batch process using that batch file, without knowing that the analysis execution file concerned has been changed. In this case, the analysis which is performed according to that analysis execution file in the batch processing will be carried out under different analysis conditions from the intended ones, with the result that the analysis result becomes different from those previously obtained. Such an analysis cannot be regarded as correct by the GLP or GMP standards.

Figure 1:
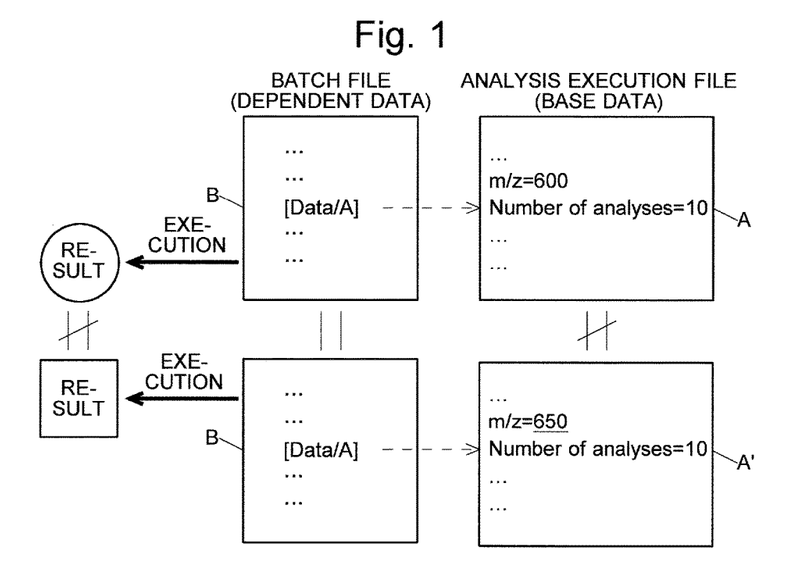
FIG. 1 is a diagram showing the relationship between the base data and the dependent data in respect of a change.

For example, in FIG. 1, consider the situation that the content of the analysis execution file A (which is hereinafter called "[Data/A]") written in the batch file B has been changed to "[Data/A]". Since the content of the batch file B is unchanged, users of this file will expect the same execution result as before. However, the execution result will actually be different from the previous one, because, among the analyses continuously performed according to the batch tile B, the analysis based on the analysis execution file A is not the same as before.

Additionally, in the case where there are two sets of identical data saved at different locations, it is possible that someone alters only one of these sets of data, making them no longer identical. If a user who does not know this fact performs some process using one of those sets of data (either the changed or non-changed set of data), believing that those sets of data are identical, the obtained result will be different from expectation or incorrect. To avoid this situation, a program for checking whether or not two sets of data are completely identical has been offered. However, this program merely determines whether or not two sets of data are identical. In such a case, if each of the two sets of data has another set of data which refers to (depends on) the two sets of data ("dependent data"), a user who performs some process using each of the two apparently unchanged sets of dependent data may possibly be confused. by having non-identical results. If the sets of data on which other data are dependent ("base data") are being monitored by the information. management system in the previously described manner, a change in one of those sets of base data can be detected. If it is not the case, a similar problem to the previously described one occurs.

The problem to be solved by the present invention is to provide an analyzing device management system which does not only detect a change in the base data but also locate dependent data which will be affected by that change.

Solution to Problem

The analyzing device management system according to the present invention developed for solving the previously described problem is an analyzing device management system for managing a plurality of sets of management target data which are data used for an analysis and control in an analyzing device, including:

a) a dependency manager for searching for, for each of the plurality of sets of management target data, all dependent management target data which are management target data dependent on the set of management target data concerned, and for creating a list of the dependent management target data; and b) a change manager for detecting a change made to any of the plurality of sets of management target data.

For each of a plurality of sets of data to be managed ("management target data"), the dependency manager searches for all management target data which depend on the set of management target data concerned ("dependent management target data"), and creates a list of dependent management target data. This list is expressed by an association of each set of management target data with the identifiers of the dependent management target data for that management target data. As the identifier of the management target data, a data identification system normally offered by information management systems can be used. For example, in the file system used in the Windows operating system (Windows is the registered trademark of Microsoft Corporation), each set (file) of management target data is given a unique identifier consisting of the absolute path (full path) ending with the file name. Needless to say, it is possible to additionally create and give an identifier consisting of numbers, alphabets, symbol strings or the like which enables unique identification of each set of management target data. As will be described later, when one set of management target data is changed, the dependent management target data which will be affected by that change can be immediately identified based on the list (association). Therefore, appropriate measures can be taken in various situations. The list should be previously stored in an appropriate storage device.

Combining the change manager with the dependency manager allows users to use the present system in a meaningful way as follows: When the change manager detects a change made to any of the plurality of sets of management target data, the management target data which will be affected by that change in the management target data can be immediately identified based on the list (of the identifiers) of the dependent management target data which depend on the changed management target data, created by the dependency manager. With this configuration, it is possible to avoid the situation that an intended result is obtained due to the use of a set of management target data which is apparently unchanged but are actually dependent on another set of management target data that has been changed.

The change manager may be configured to make a set of management target data protected from change when another set of management target data on which the former set of management target data depends is protected from change.

The change manager may also be configured to make a set of management target data on which another set of change-protected management target data depends protected from change, create a copy of the former set of management target data, and permit a change of this copy of the management target data.

The analyzing device management system according to the present invention may further include the following element in addition to a) and b):

c) a difference analyzer for checking whether or not there is a difference between two sets of management target data among the plurality of sets of management target data.

If it is determined by this difference analyzer that there is a difference between the two sets of management target data (i.e. the two sets of management target data are not identical), the management target data which will be affected by the fact that the two sets of management target data being compared are not identical can be immediately identified based on the lists (of the identifiers) of the dependent management target data of the two sets of management target data, created by the dependency manager. With this configuration, it is possible to avoid the situation that an intended result is obtained due to the use of a set of management target data which depends on one of the two sets of management target data which are presumed to be identical.

The change manager may be configured to be capable of detecting not only a change in the management target data but also an addition (creation) and deletion (disappearance) of a set of management target data. When such a change manager is provided, the dependency manager should preferably be capable of updating the dependency-based association among the management target data. In this case, when a new dependency relationship is formed among the management target data as a result of the addition (creation) of or change in a set of management target data, the dependency manager associates this set of management target data with another set of management target data on which the former set of management target data depends. On the other hand, when one dependency relationship is cancelled as a result of the deletion of (disappearance) or change in a set of management target data, the dependency manager dissolves the association of this set of management target data with another set of management target data on which the former set of management target data was dependent.

Advantageous Effects of the Invention

The present invention makes it possible to detect not only a change in a set of management target data (base data) but also an effective change in another set of management target data (dependent data) which depends on the base data. As a result, users of the dependent data can be informed of a change in the base data. For example, when an analysis execution file (base data) written in a batch tile (dependent data) for a continuous analysis control in a controller of an analyzing device is changed, the users of this batch file can be informed of the change in the analysis execution file. As a result, the use of a batch file which disagrees with the assumption can be prevented, and a useless or incorrect analysis can be prevented.

DESCRIPTION OF EMBODIMENTS

As one embodiment of the present invention, the following description deals with an example in which the present invention is applied in an analysis-controlling and data-analyzing system for controlling an analyzing device and analyzing the data obtained with the analyzing device. Specifically, the following description in the present embodiment is concerned with the information management system, included in the analysis-controlling and data-analyzing system, for managing the management target data, such as the control data and parameters used in the analysis control as well as the data obtained by an analysis (raw data) and the secondary data obtained as a result of analyzing the raw data.

Figure 2:
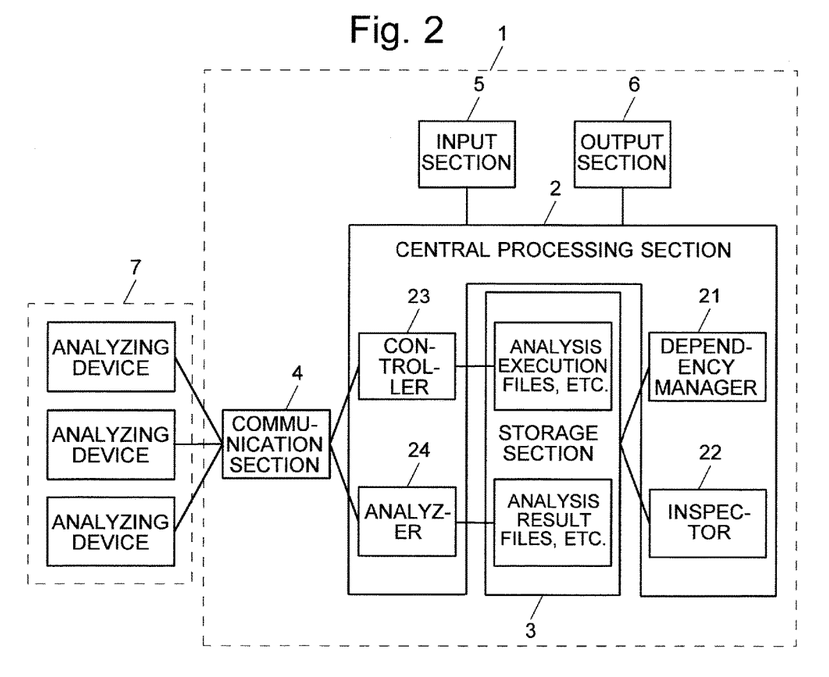
FIG. 2 is a block diagram showing the basic configuration of an information management system according to one embodiment of the present invention.

FIG. 2 shows the basic configuration of the information management system 1 according to one embodiment of the present invention (which is hereinafter simply called the "system 1"). The system 1 is actually a computer with a central processing section 2, storage section 3, communication section 4, input section 5, output section 6 and other sections. The central processing section 2, which is realized by a CPU (central processing unit) or similar device, controls each section of the system 1 by executing programs. The storage section 3, which is realized by a flash memory, HDD (hard disc drive), SSD (solid state drive) or similar rewritable non-volatile storage device, is a section in which the management target data, programs executed by the central processing section 2, data necessary for the program execution, results obtained by the program execution and the like are stored in the form of files. The communication section 4, which is realized by a NIC (network interface card), wireless LAN adapter or similar device, is used for the communication between the system 1 and analyzing devices 7 as well as for other purposes. The input section 5, which is realized by a keyboard, mouse, touchscreen, microphone or other devices, is used for an input of commands into the system 1 and for other purposes. The output section 6, which is realized by a liquid crystal display, printer, speaker or other devices, is used for displaying the content of the management target data, for displaying results of the program execution, for notifying users of the inspection trail (and other information) from an inspector 22, and for other purposes.

The central processing section 2 includes a dependency manager 21, inspector 22, controller 23, analyzer 24 and other functional components. These are actually programs executed by the central processing section 2. The dependency manager 21 constantly or regularly monitor the management target data stored in the storage section 3 and manages the association based on the dependency relationship among the management target data. The dependency manager 21 also performs other related tasks, such as the updating of the association based on the dependency relationship among the management target data and the creation of a list of the identifiers of the dependent management target data for a set of management target data. The inspector 22 constantly or regularly monitor the management target data stored in the storage section 3 and performs various tasks, such as the detection of an addition, deletion or change of a set of management target data, comparison of one set of management target data with another, determination on whether or not a change in a set of management target data should be permitted, and notification of change information or difference information. The controller 23 controls the analyzing devices 7 connected to the system 1 via the communication section. The analyzer 24 performs an analysis of the output results from the analyzing devices 7 (or other similar process), and provides the analysis result through the output section 6, or saves it in the storage section 3.

As will be described later, the dependency manager 21 creates a list of the identifiers of the dependent management target data. The identifiers should have an appropriate form which enables unique identification of each set of management target data, such as the full path of the dependent management target data or a character string consisting of numbers, alphabets or symbols assigned by the file system. For each set of management target data, the dependency manager 21 associates the set of management target data with an identifier of another set of management target data which depends on the former set of management target data (dependent management target data). This association may be formed by any method which enables a search for the identifier of the dependent management target data from a set of management target data. For example, the identifier of a set of dependent management target data may be incorporated into the management target data on which the former set of data depends. It is also possible to separately create a correspondence table, database or similar form of data which enables a search for the identifier of the dependent management target data using the identifier of a set of management target data as the key.

Figure 4:
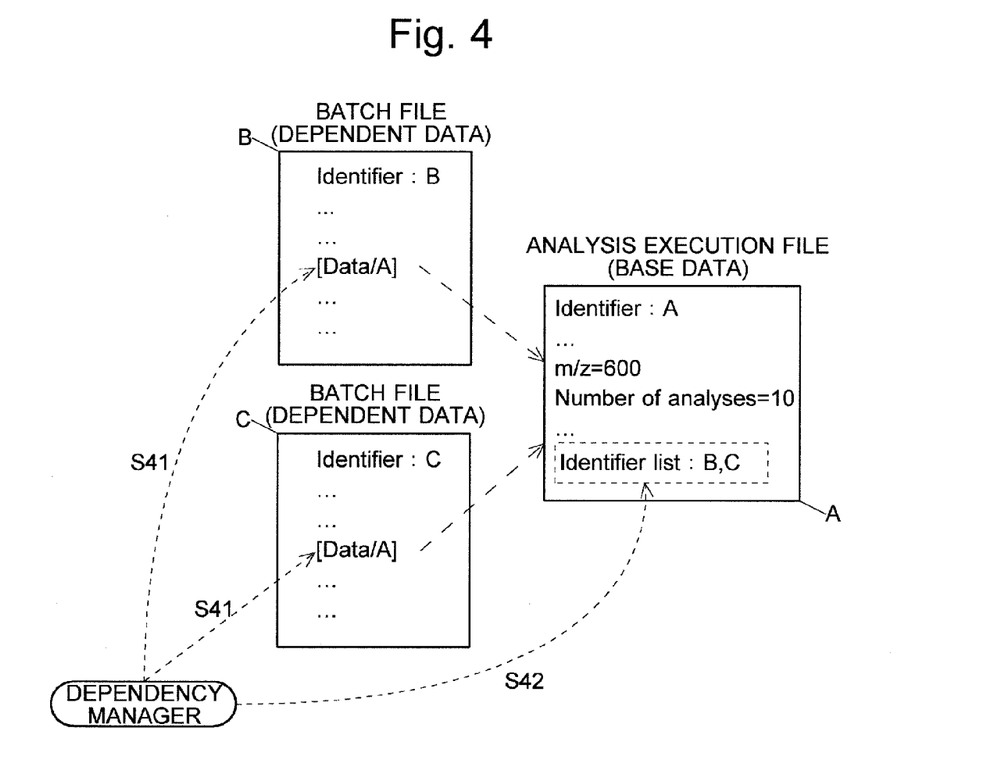
FIG. 4 is a block diagram showing a process performed by a dependency manager.

FIG. 4 shows the flow of a process performed by the dependency manager 21. Iii FIG. 4, if a set of management target data with identifier "Y" contains a description of "[Data/X]", it means that the management target data "Y" refer to the management target data "X", or in other words, the management target data "Y" depend on the management target data "X" (i.e. the management target data "Y" are dependent management target data for the management target data "X"). In FIG. 4, the batch file B contains a description of "[Data/A]". This means that the batch file B depends on the analysis execution file A. The same applies to the batch file C.

The dependency manager 21 examines the content of each set of management target data and searches for a description relating to another set of management target data (Step S41). Needless to say, if the description relating to another set of management target data fully includes the identifier of the set of management target data concerned, it is possible to definitely identify that set of management target data. Even if that description includes only a portion of the identifier, it ay be possible to fully determine that identifier (i.e. to identify another set of management target data concerned). For example, consider the case where the full path name of the management target data. is used as the identifier, and one set of management target data includes, as a part of its content, the description of only the file name of another set of management target data. In this case, this set of management target data can be identified by interpreting that file name as the name of a file having that file name in the same folder that contains the management target data being examined (current folder). In the case where one set of management target data includes the description of a relative path name as a part of its content, the management target data which the relative path name points to can be identified by expanding the relative path into the full path name.

When the description relating to another set of management target data is located, the identifier of the set of management target data which includes that description as its content is associated with the set of management target data identified by the identifier shown in that description (Step S42). In the present embodiment, this is achieved by incorporating the identifier of the set of management target data containing that description into the set of management target data identified by the identifier interpreted from that description. In FIG. 4, since the batch file B (dependent data) and batch file C (dependent data) depend on the analysis execution file A (base file), their identifiers are incorporated into the analysis execution file A.

Figure 5:
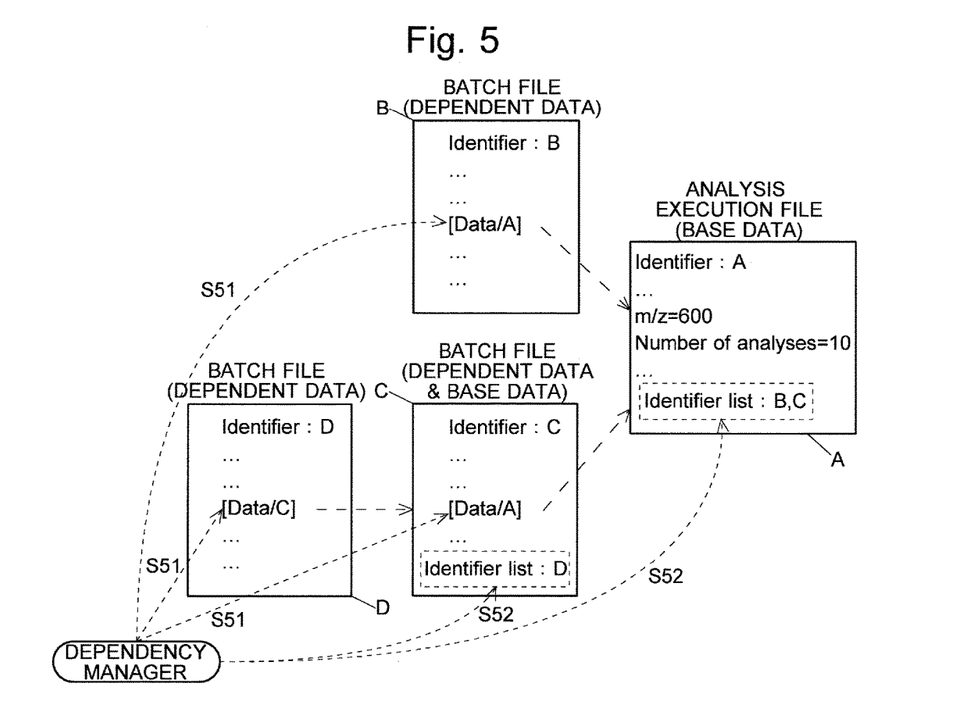
FIG. 5 is a block diagram showing a process performed by the dependency manager in the case where there is a set of management target data which is both dependent data and base data.

FIG. 5 shows the flow of a process performed by the dependency manager 21 in the case where there is a set of management target data which is both dependent data and base data (batch tile C). The processes of Steps S51 and S52 are the same as Steps S41 and S42, respectively. As opposed to FIG. 4 in which the batch file C is dependent data but not base data, the batch file C in FIG. 5 is not only base data but also dependent data, since the batch file D depends on the batch file C. Accordingly, in FIG. 5, the identifier of the batch file D is incorporated into the batch file C.

Figure 3:
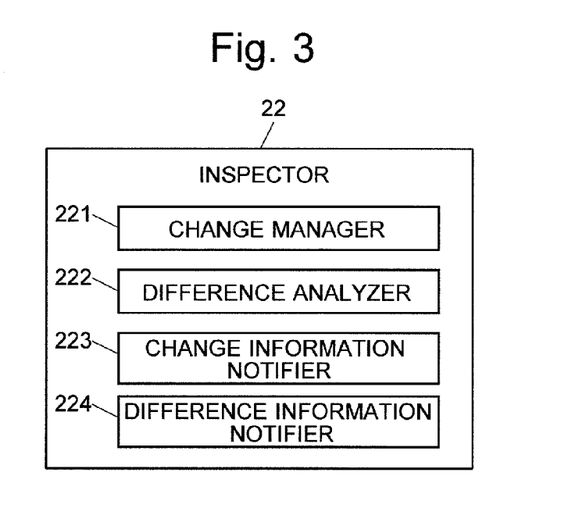
FIG. 3 is a block diagram showing the configuration of an inspector.

Next, the inspector 22 is described (see FIG. 3). The inspector 22 includes a change manager 221, difference analyzer 222, change information notifier 223, and difference information notifier 224. The change manager 221 detects a change in the management target data and calls the dependency manager 21. Whether or not a change has been made is determined, for example, based on a change in the date and time of modification (creation, update, etc.), change in the file size and/or change in the content of the file. Additionally, the change manager 221 makes one set of management target data protected from change if another set of management target data which depends on the former set of management target data is protected from change.

For example, in FIG. 5, if the batch file B is made to be protected from change, the change manager 221 calls the dependency manager 21 to locate the management target data on which the batch file B depends, and makes the located management target data protected from change. In the present example, it is the analysis execution file A that is located. Accordingly, the change manager 221 makes the analysis execution file A protected from change.

The difference analyzer 222 compares two sets of management target data and determines whether or not they are identical. If they are determined to be non-identical by the difference analyzer 222, the dependency manager 21 is called. The change information notifier 223 notifies the users of the management target data, of information on the change detected by the change manager 221. Possible items of the information on the change include the user who made the change, date of change, contents of change, reason for the change, identifier of a set of dependent management target data which depends on the changed management target data, whether or not the data are protected from change, reason for the protection, and identifier of a copy of the management target data concerned (see FIGS. 15A, 15B and 15C). The difference information notifier 224 informs the users of the management target data, of information on the data identity determined by the difference analyzer 222. Possible items of the information on the data identity include the date of determination, reason for the determination that the data were non-identical (content of the difference), identifiers of the sets of dependent management target data determined to be non-identical (see FIG. 15D).

Figure 6:
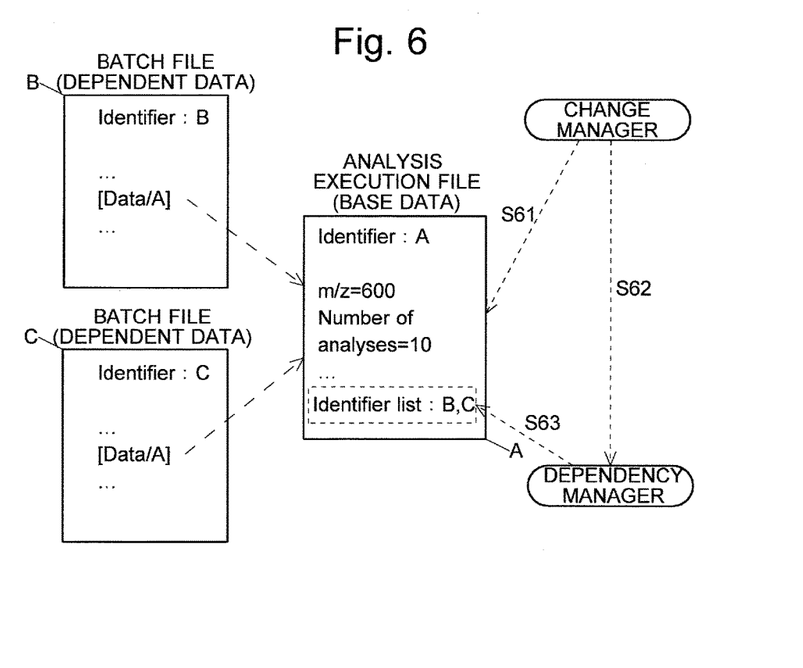
FIG. 6 is a block diagram showing a process performed by a change manager and the dependency manager.

FIG. 6 shows the flow of a process performed by the change manager 221 and dependency manager 21. When a change in the analysis execution file A is detected by the change manager 221 (Step S61), the dependency manager 21 is called (Step S62). The dependency manager 21 updates the identifiers of the dependent management target data associated with the set of management target data whose change has been detected, and creates a list of the identifiers of the dependent management target data associated with the set of management target data whose change has been detected (Step S63). In FIG. 6, since the batch files B and C depend on the analysis execution file A, the dependency manager 21 writes the identifiers B and C in the list.

Figure 7:
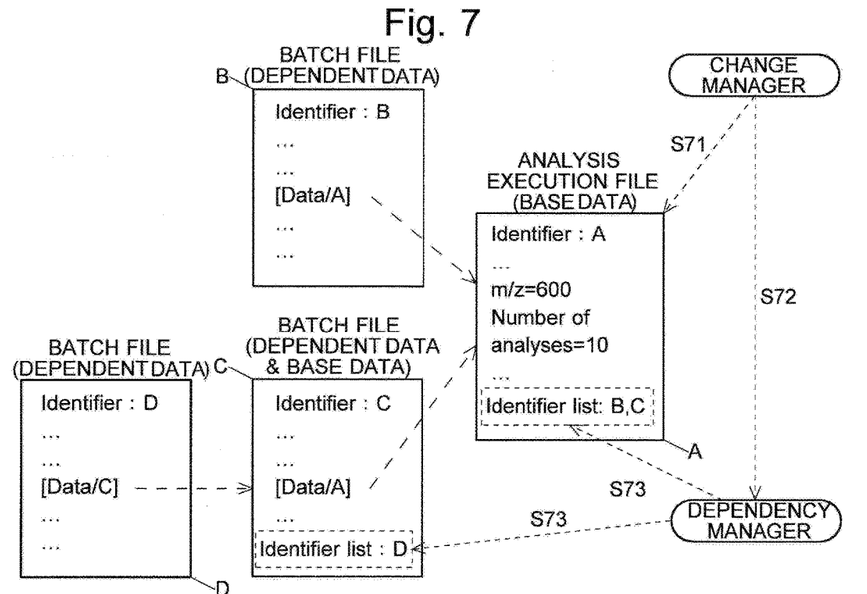
FIG. 7 is a block diagram showing a process performed by the change manager and the dependency manager in the case where there is a set of management target data which is both dependent data and base data.

FIG. 7 shows the flow of a process performed by the change manager 221 and dependency manager 21 in the case where there is a set of management target data which is both dependent data and base data (batch file C). The processes of Steps S71 through S73 are the same as Steps S61 through S63, respectively. in this case, since the batch file D is dependent on the batch file C, the dependency manager 21 writes the identifier D in the list in addition to the identifiers B and C.

Figure 8:
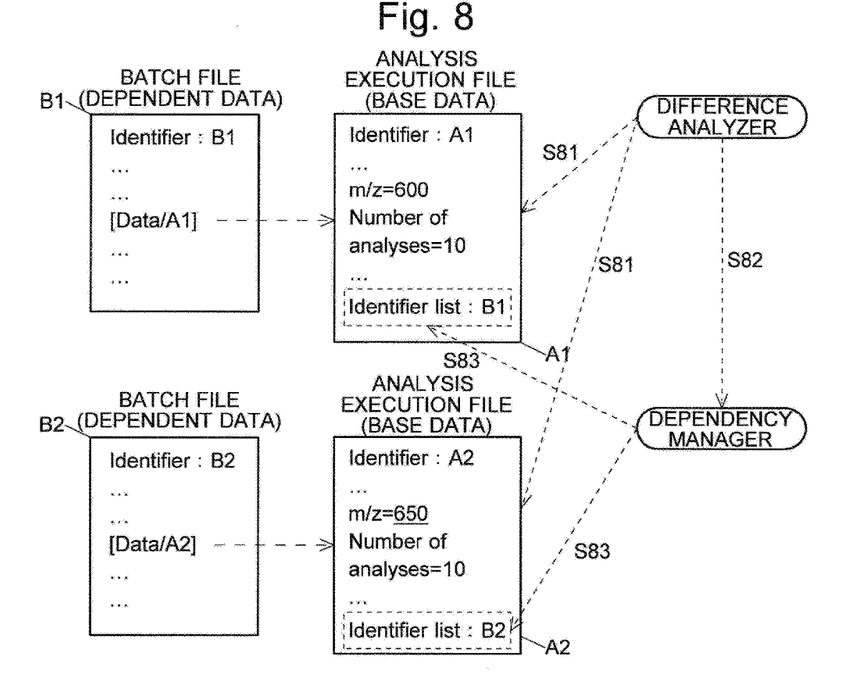
FIG. 8 is a block diagram showing a process performed by a difference analyzer and the dependency manager.
Figure 9:
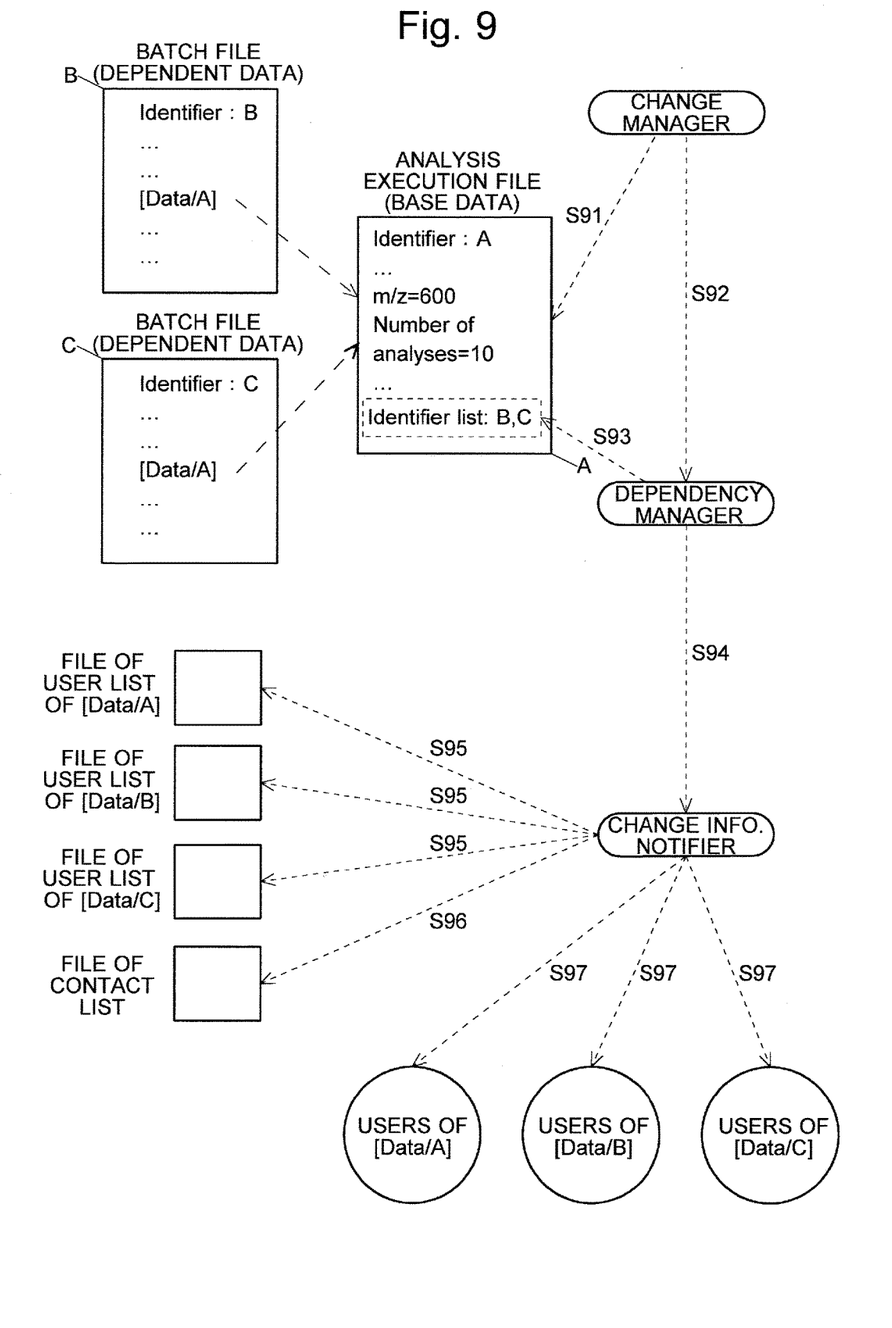
FIG. 9 is a block diagram showing a process performed by a change information notifier when a change is detected by the change manager (in the case where the user list and contact list are individually saved as separate files).
Figure 10:
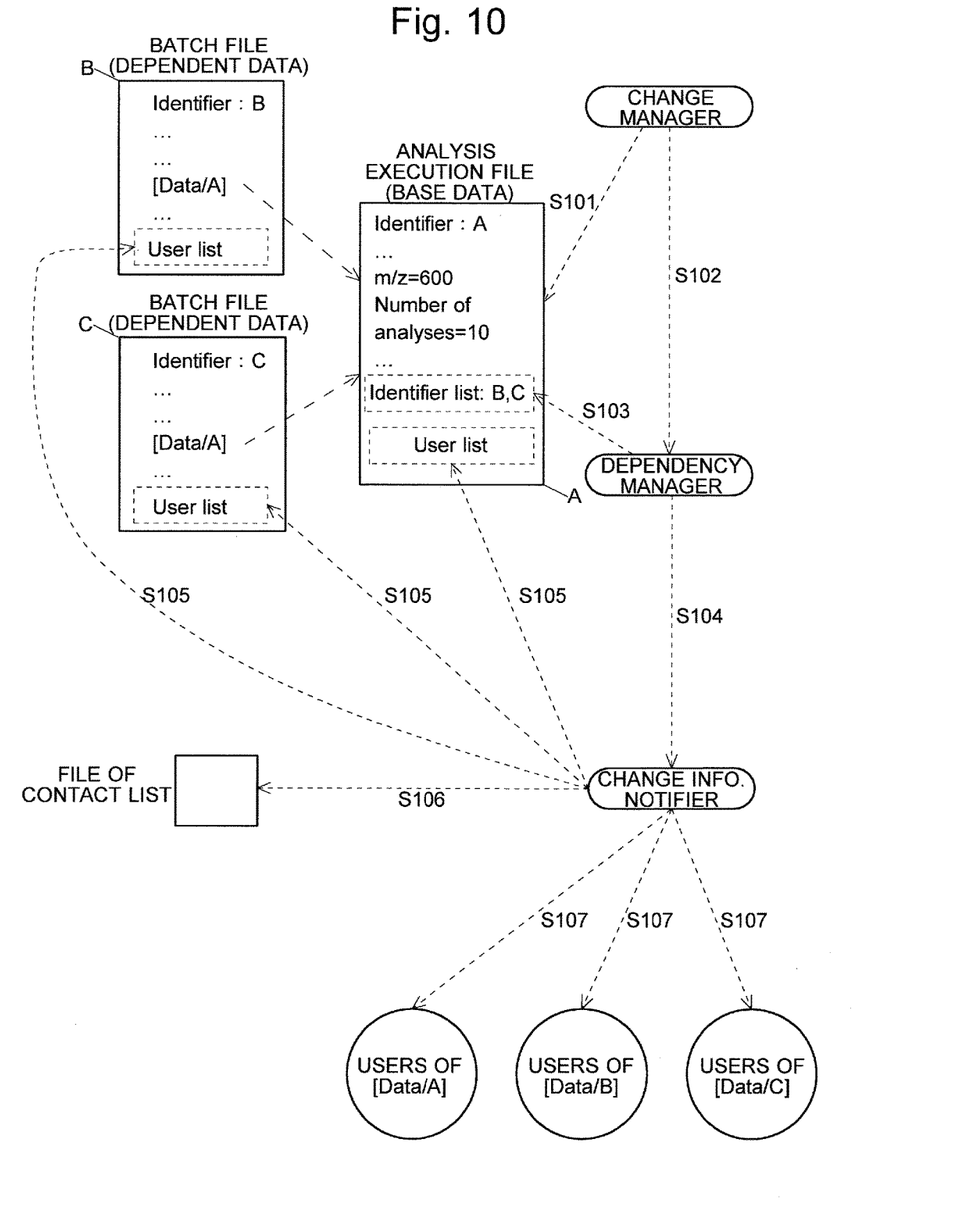
FIG. 10 is a block diagram showing a process performed by the change information notifier when a change is detected by the change manager (in the case where the user list is saved as a portion of the management target data while the contact list is saved as a separate file).
Figure 11:
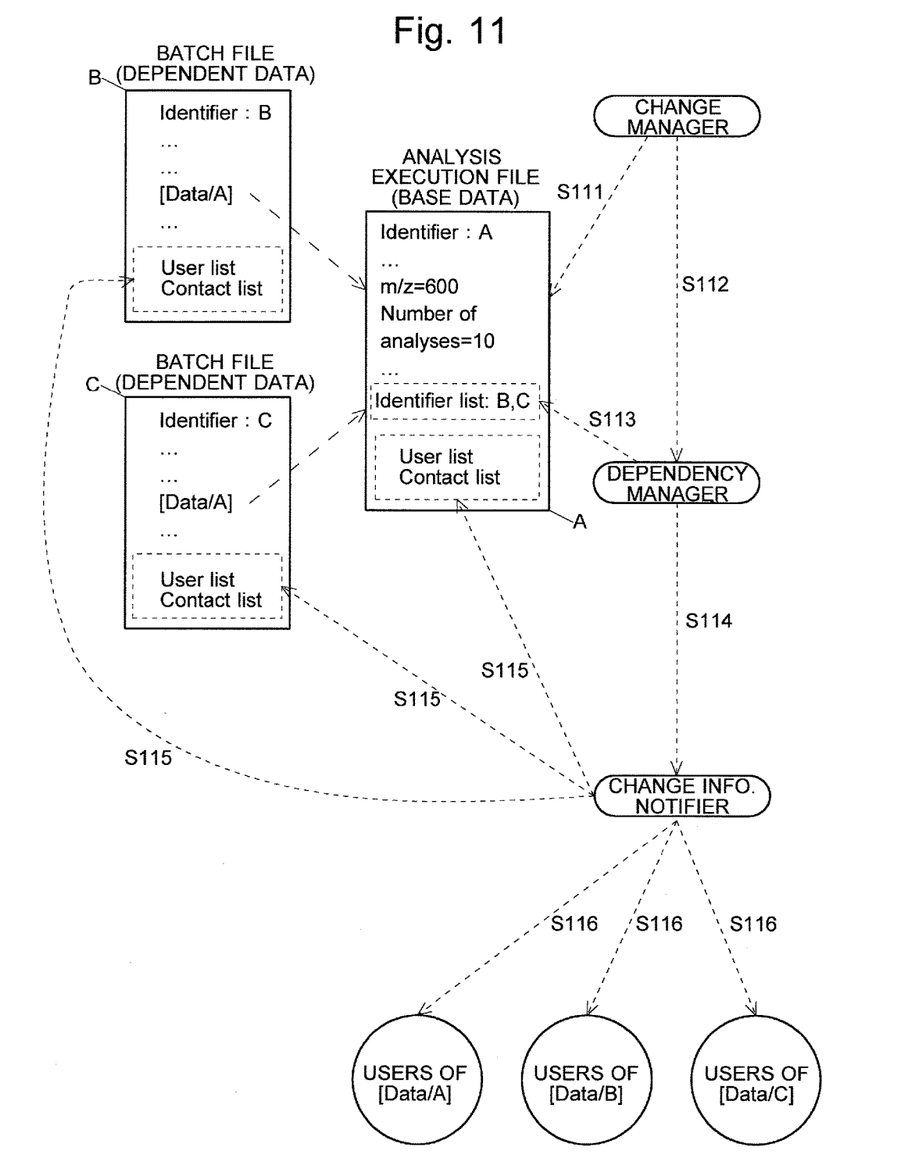
FIG. 11 a block diagram showing a process performed by the change information notifier when a change is detected by the change manager (in the case where the user list and contact list are saved as a portion of the management target data).

FIG. 8 shows the flow of a process performed by the difference analyzer 222 and dependency manager 21. Since the analysis execution files A1 and A2 have different values of the mass-to-charge ratio (m/z), these two files are determined to be non-identical when compared by the difference analyzer 222 (Step S81). In this case, the dependency manager 21 is called (Step S82). The dependency manager 21 writes, in the list, the identifiers B1 and B2 of the batch files B1 and B2 which depend on the analysis execution files A1 and A2, respectively (Step S83), FIGS. 9-11 show the flow of a process performed by the change information notifier 223 when a change in the management target data is detected. In FIG. 9, in which the batch files B and C depend on the analysis execution file A, consider the situation that a change in the analysis execution file A has been detected by the change manager 221 (Steps S91 through S93). The processes of Steps S91 through S93 are the same as Steps S61 through S63, respectively. After the dependency manager 21 writes the identifiers of the dependent management target data in the list, the change information notifier 223 is called (Step S94). The change information. notifier 223 reads the user list of the analysis execution file A in which the change has been detected, as well as those of the batch files B and C (Step S95), and searches for the contact information of each user (Step S96). After that, the change information notifier 223 informs the users of the analysis execution file A, batch file B and batch file C of the information on the change (Step S97).

For the management of the users of each set of management target data, any method may be used which enables a search for the users from the identifier of each set of data. For example, a user ay be saved as a separate file for each set of management target data or incorporated into each set of management target data. It is also possible to separately create a correspondence table, database or similar form of data which enables a search for the users using the identifier of each set of data as the key. The contact list of the users may be managed by any method which enables a search for the contact information from user information. For example, a contact list of the users may be saved as a separate file or incorporated into each set of management target data. It is also possible to separately create a correspondence table, database or similar form of data which enables a search for the contact information using user information as the key. In FIG. 9, the user list is saved as a separate file for each set of management target data. The contact list of the users is also saved as a separate file. In FIG. 10, the user list is incorporated into each set of management target data, while the contact list of the users is saved as a separate file. The processes of Steps S101 through S107 are the same as Steps S91 through S97, respectively. In FIG. 11, the user list and contact list are both incorporated into each set of management target data. The processes of Steps S111 through S114 are the same as Steps S91 through S94, respectively. The process of Step S115 corresponds to Steps S95 and S96 combined together. The process of Step S116 is the same as Step S97.

Figure 12:
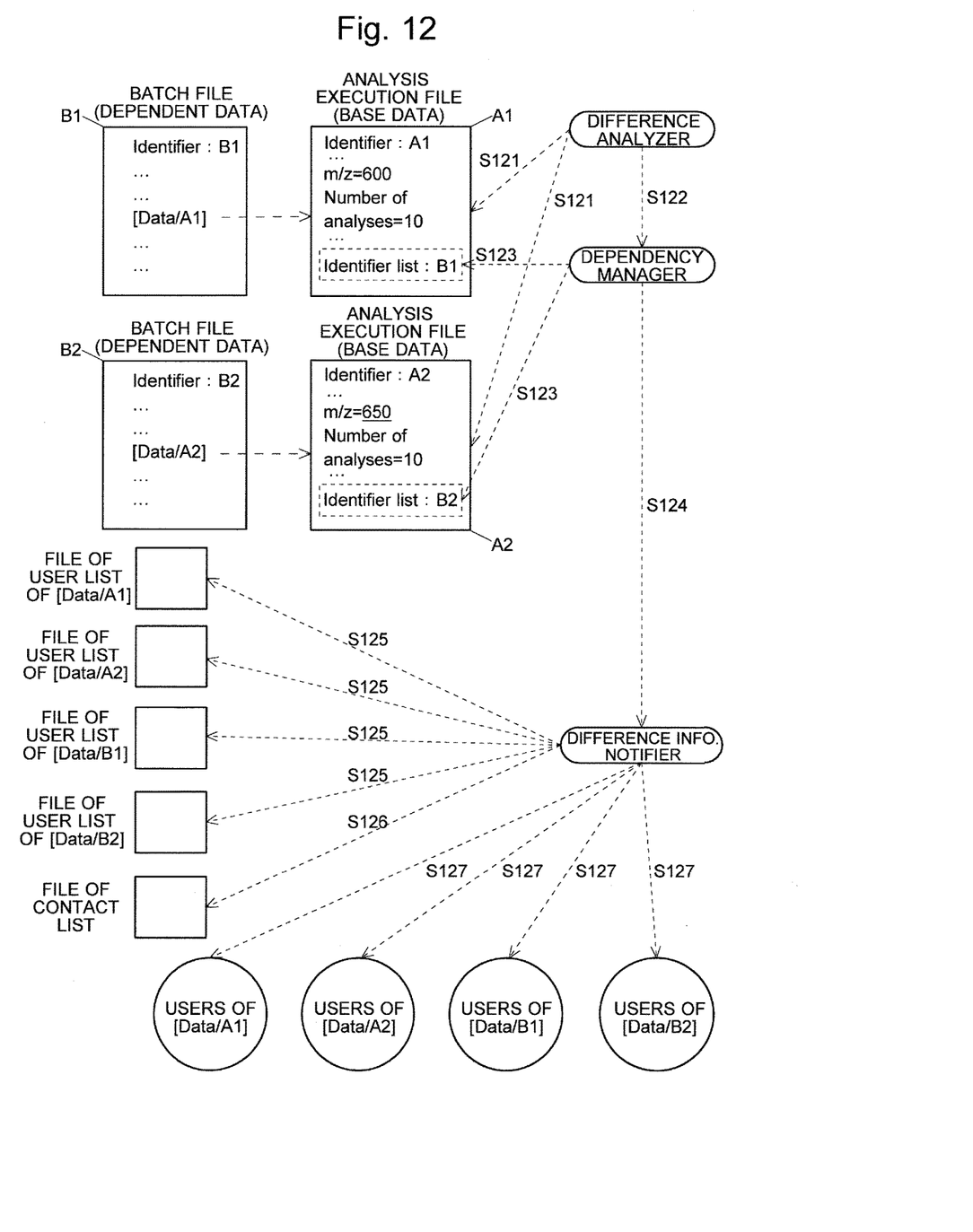
FIG. 12 is a block diagram showing a process performed by a difference information notifier when a difference is detected by a difference analyzer (in the case where the user list and contact list are individually saved as separate files).
Figure 13:
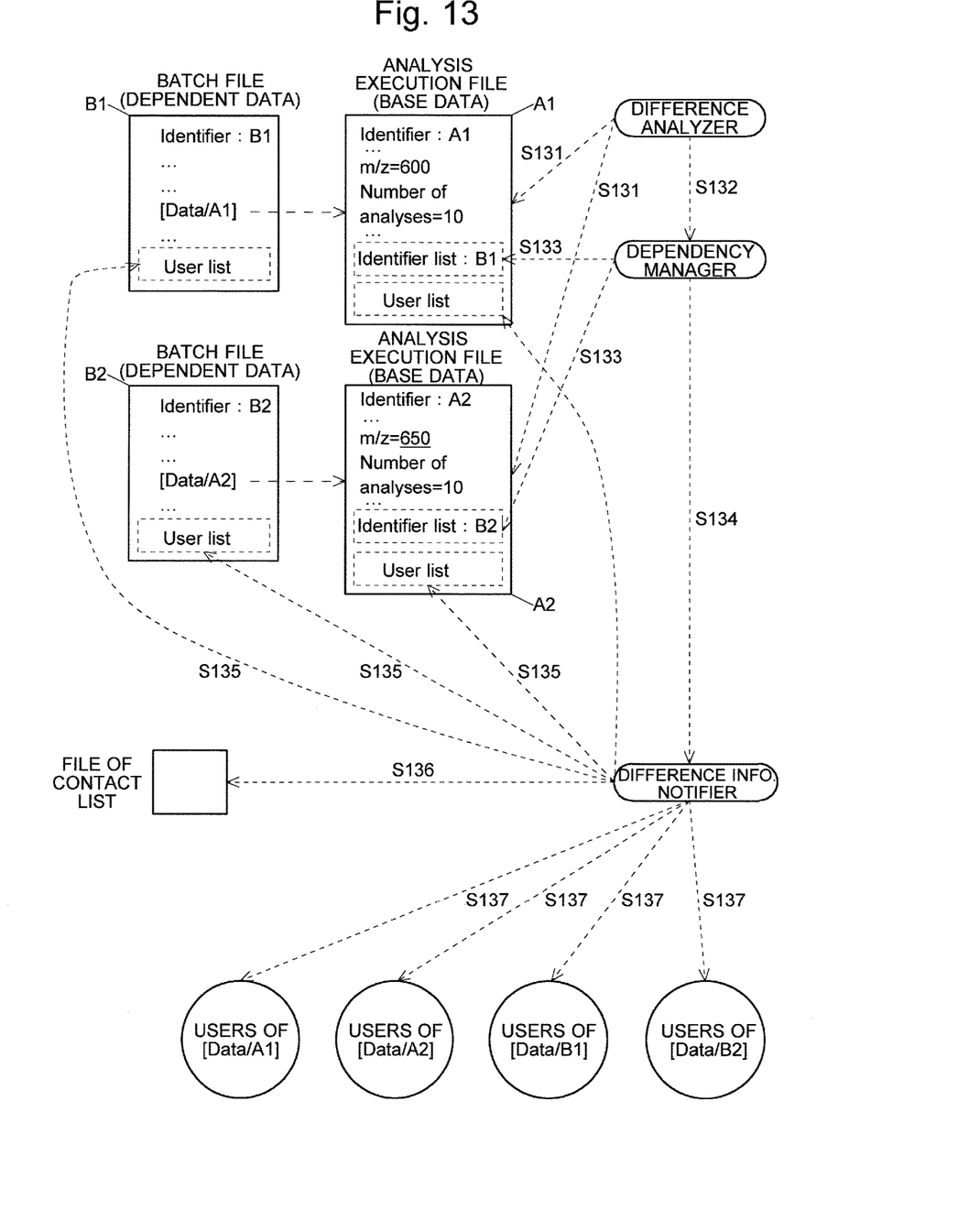
FIG. 13 is a block diagram showing a process performed by the difference information notifier when a change is detected by the difference analyzer (in the case where the user list is saved as a portion of the management target data while the contact list is saved as a separate file).
Figure 14:
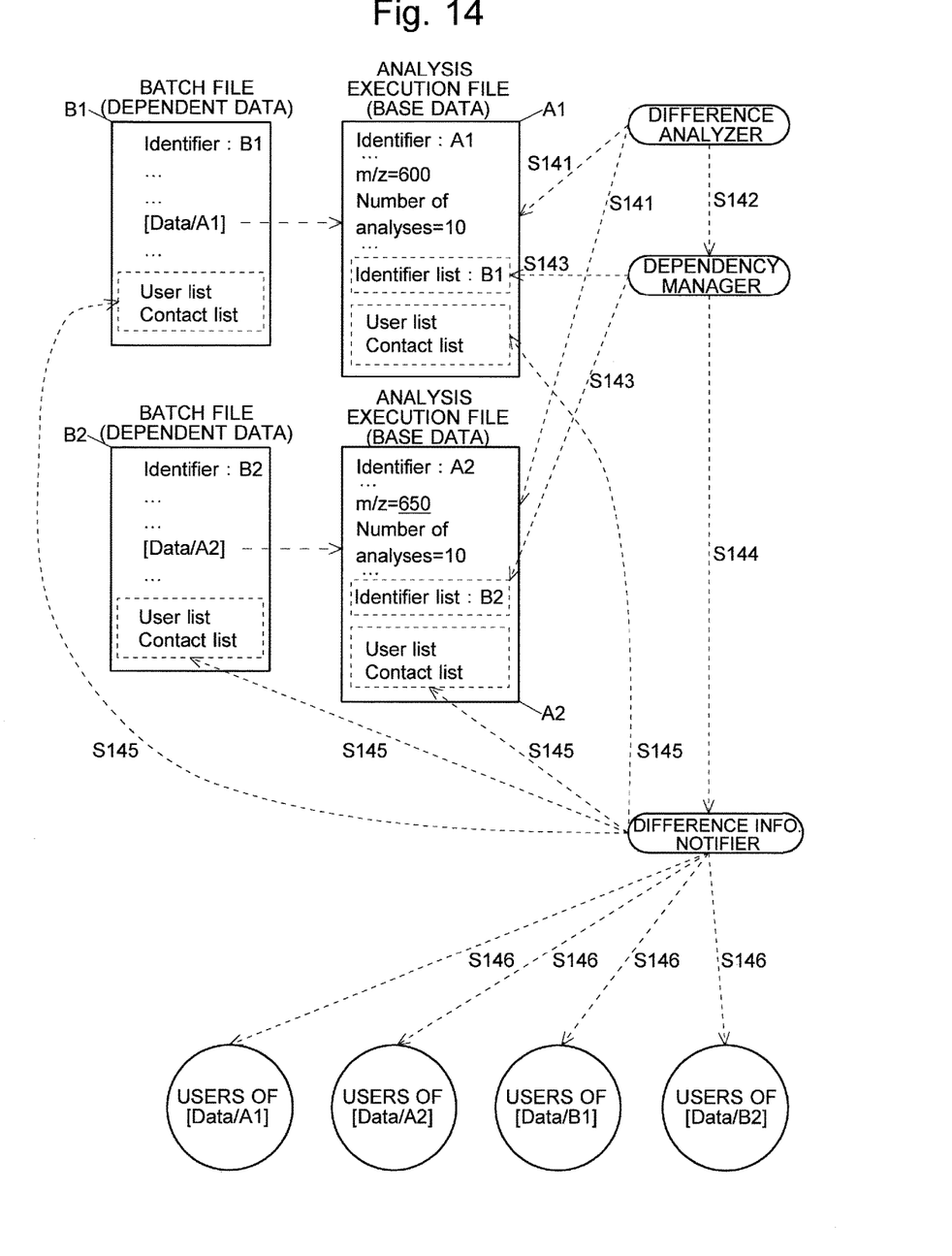
FIG. 14 is a block diagram showing a process performed by the difference information notifier when a difference is detected by a difference analyzer (in the case where the user list and contact list are both saved as a portion of the management target data).
Figure 15A:
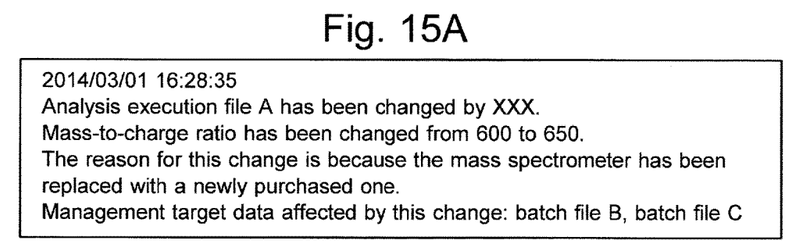
FIGS. 15A-15D are examples of the messages which are respectively issued by the change information notifier and difference information notifier.
Figure 15B:
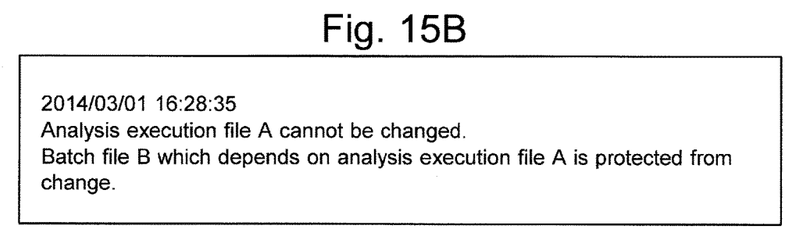
Figure 15C:
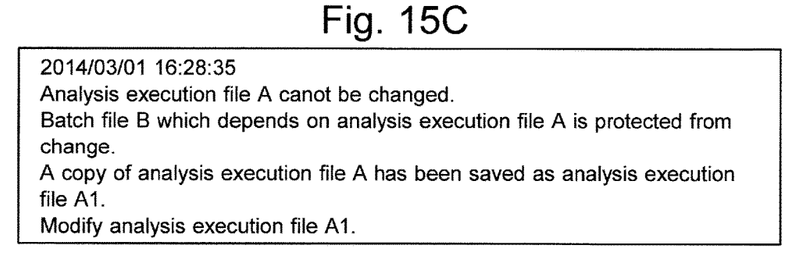
Figure 15D:
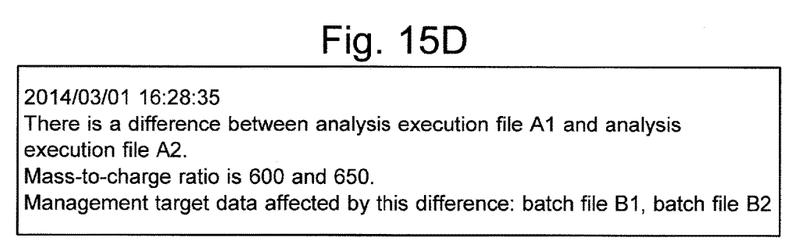

FIGS. 12-14 show the flow of a process performed by the difference information notifier 224 when two sets of management target data are determined to be non-identical. In FIG. 12, consider the situation that the two analysis execution files A1 and A2, which have different values of the mass-to-charge ratio, have been compared with each other by the difference analyzer 222 and determined to be non-identical (Steps S121 through S123). The processes of Steps S121 through S123 are the same as Steps S81 through S83, respectively. After the identifiers of the dependent management target data are written in the lists by the dependency manager 21, the difference information notifier 224 is called (Step S124). The difference information notifier 224 reads the user lists of the analysis execution files A1 and A2 which have been determined to be non-identical, as well as those of the batch files B1 and B2 (Step S125), and searches for the contact information of each user (Step S126). After that, the difference information notifier 224 notifies the users of the analysis execution file A1, analysis execution file A2, batch file B1 and batch file B2 of the information on the difference (Step S127). In FIG. 12, the user list is saved as a separate file for each set of management target data. The contact list is also saved as a separate file. In FIG. 13, the user list is incorporated into each set of management target data, while the contact list of the users is saved as a separate file. The processes of Steps S131 through S137 are the same as Steps S121 through S127, respectively. In FIG. 14, the user list and contact list are both incorporated into each set of management 1.0 target data. The processes of Steps S141. through S144 are the same as Steps S121 through S124, respectively. The process of Step S145 corresponds to Steps S125 and S126 combined together. The process of Step S146 is the same as Step S127.

Thus far, one embodiment of the present invention has been described. It should be noted that the previous embodiment is a mere example and can be appropriately changed, improved or modified within the spirit of the present invention. For example, in the previous description of the embodiment, it is assumed that the change manager 221, dependency manager 21 and change information notifier 223 are implemented as separate programs. However, these tour kinds of processing may be performed in a single program, or two or three of those processes may be performed in a single program. The same applies to the difference analyzer 222, dependency manager 21 and difference information notifier 224. The same also applies in the case where the change manager 221 and the difference analyzer 222 are implemented as a single program.

REFERENCE SIGNS LIST

1 . . . Information Management System
2 . . . Central Processing Section
  21 . . . Dependency Manager
  22 . . . Inspector
    221 . . . Change Manager
    222 . . . Difference Analyzer
    223 . . . Change Information Notifier
    224 . . . Difference Information Notifier
  23 . . . Controller
  24 . . . Analyzer
3 . . . Storage Section
4 . . . Communication Section

The invention claimed is:

1. An analyzing device management system for managing a plurality of analysis execution files in which a set of data which represent control commands or control parameters for operating an analyzing device are saved, comprising:
    a dependency manager, executed on a central processing section of the analyzing device management system, to search each of the plurality of analysis execution files for all batch files which depend on the analysis execution file concerned, and to create a list of the batch files;
    a change manager, executed on the central processing section of the analyzing device management system, for detecting a change made to any of the plurality of analysis execution files; and
    a change information notifier, executed on the central processing section of the analyzing device management system, for specifying the user of the analysis execution file whose change is detected by the change manager and the user of the batch file dependent on the change-detected analysis execution file, searching for the contact information of these users that are registered in advance, and noticing each user of information on the change.

2. The analyzing device management system according to claim 1, wherein, when a batch file is protected from change, the change manager prohibits changing of the analysis execution file on which the change-protected batch file depends.

3. The analyzing device management system according to claim 1, wherein, when a batch file is protected from change, the change manager prohibits changing of the analysis execution file on which the change-protected batch file depends, creates a copy of the change-protected analysis execution file, and permits a change of this copy of file.

4. The analyzing device management system according to claim 1, further comprising:
   a difference analyzer for checking whether or not there is a difference between two analysis execution files among the plurality of analysis execution files.

5. The analyzing device management system according to claim 1, wherein the change manager detects an addition to, deletion from, and change in the analysis execution file.

6. The analyzing device management system according to claim 5, wherein the dependency manager updates dependency-based association among analysis execution files and the batch files.

7. The analyzing device management system according to claim 1, wherein the change information notifier notifies of a reason for an occurrence of the change.

8. The analyzing device management system according to claim 4, further comprising:
   wherein the difference information notifier notifies of information on a difference between the two analysis execution files among the plurality of analysis execution files.

9. The analyzing device management system according to claim 8, wherein the difference information notifier notifies of a reason for an occurrence of the difference.

10. The analyzing device management system according to claim 1, wherein the change manager further detects a change made to any of the plurality of batch file.

\* \* \* \* \*